May 8, 1962 H. W. MOULD, JR 3,033,370
SIFTING APPARATUS
Filed Aug. 17, 1959 3 Sheets-Sheet 1
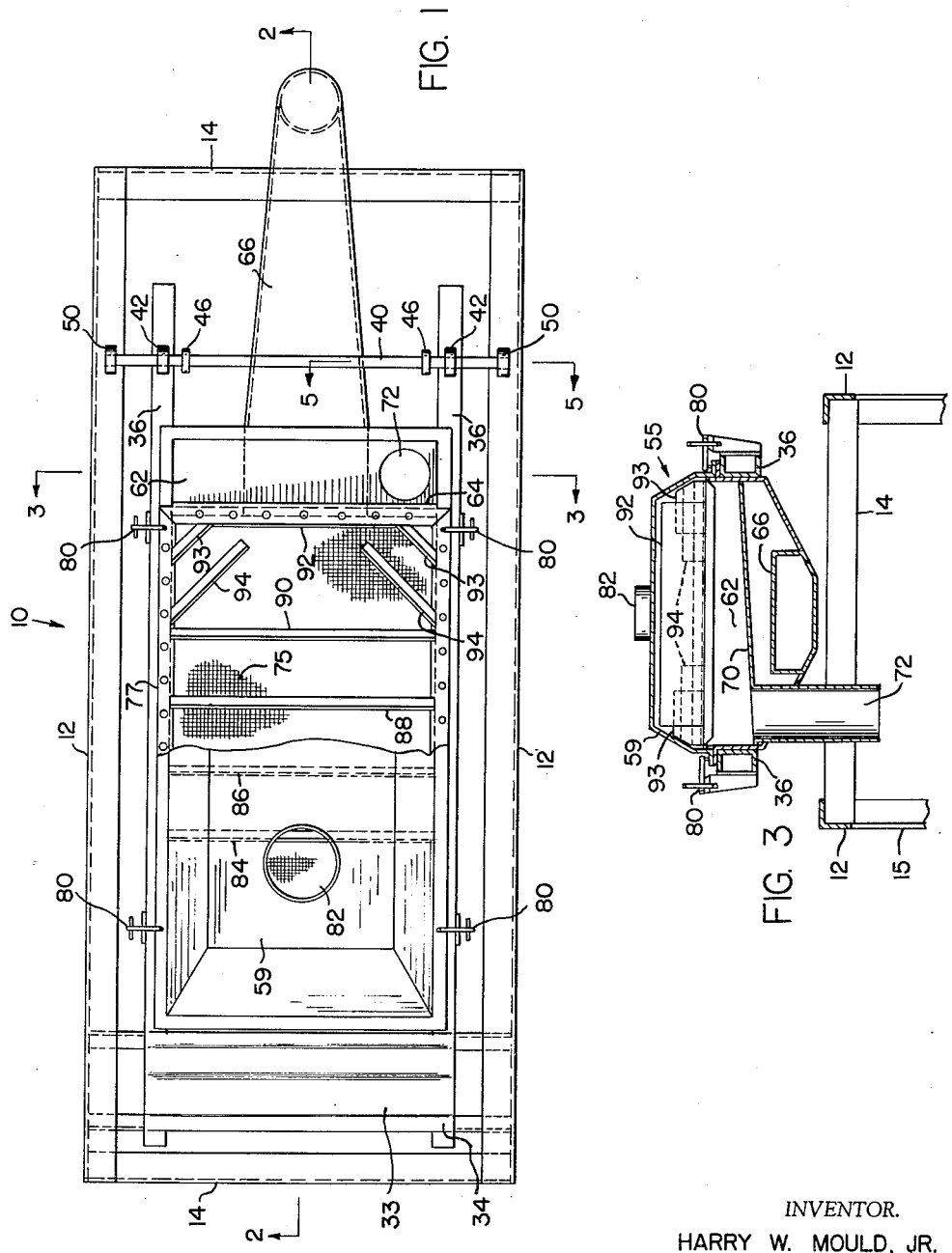
INVENTOR.
HARRY W. MOULD, JR.
BY
Attorney

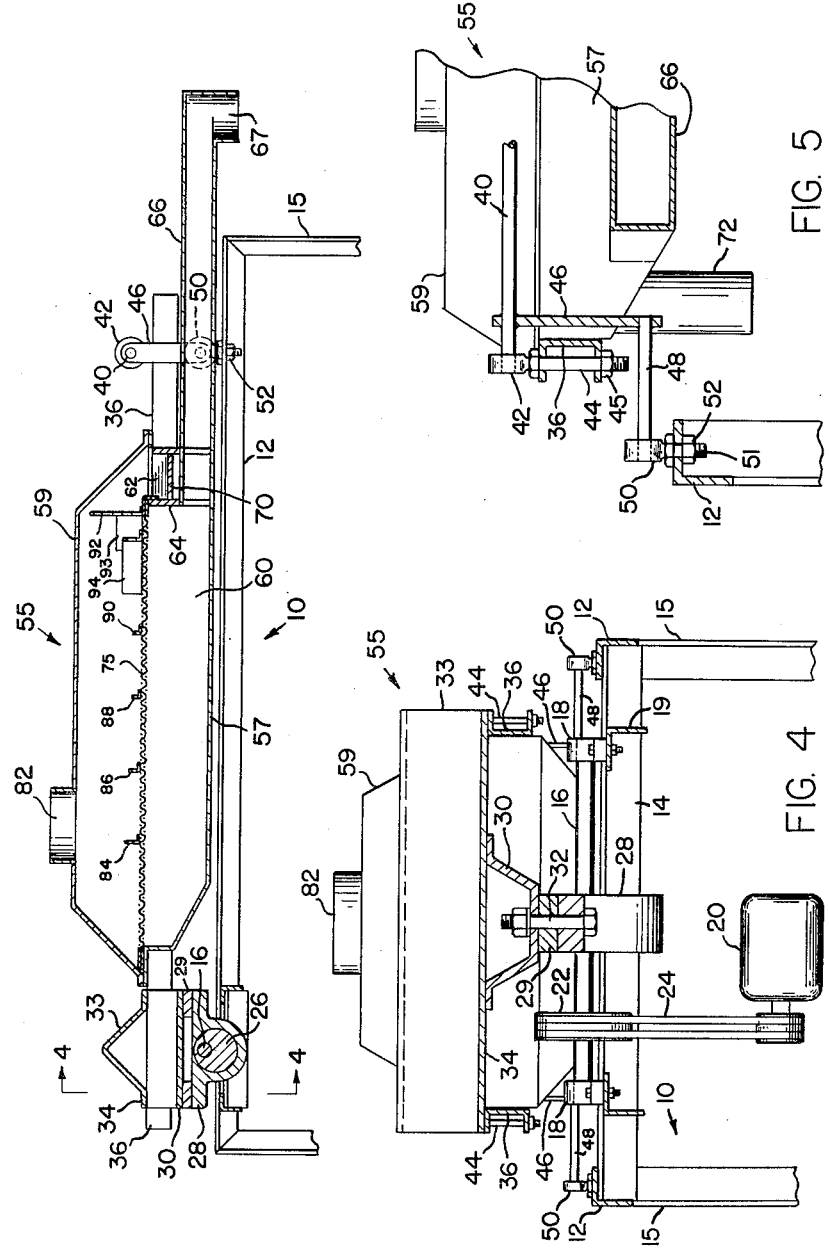

May 8, 1962 H. W. MOULD, JR 3,033,370
SIFTING APPARATUS
Filed Aug. 17, 1959 3 Sheets-Sheet 3

INVENTOR.
HARRY W. MOULD, JR.
BY
Attorney

United States Patent Office 3,033,370
Patented May 8, 1962

3,033,370
SIFTING APPARATUS
Harry W. Mould, Jr., Kenmore, N.Y., assignor, by mesne assignments, to Entoleter, Inc., a corporation of Delaware
Filed Aug. 17, 1959, Ser. No. 834,189
11 Claims. (Cl. 209—325)

The present invention relates to sifting apparatus, and more particularly to an improved apparatus for effecting uniform particle separation of powdered products, such as powdered milk, chemicals, pharmaceuticals, cereals, and the like.

Heretofore, in sifting products such as mentioned above, the powdered material to be sifted was dumped onto a screen which was usually tilted toward one side. The sifting operation was effected by horizontal sidewise reciprocation of the screen through operation of an eccentric. The screen had to be tilted longitudinally at a considerable angle to the horizontal so that the material to be sifted was conveyed by gravity over the screen. Moreover, rubber balls usually had to be placed on the screen with the material to be sifted, to assist in agitating the mass and also to prevent the pores in the screen from becoming clogged. This conventional apparatus has the disadvantage that it has to be of considerable height to achieve the desired gravity flow of material from one end of the screen to the other. Furthermore, this conventional apparatus is unsatisfactory in that pieces tend to chip off the rubber balls and fall through the screen and mix with the sifted product. As a result, powdered milk, for instance, sifted by conventional apparatus is really a mixture of rubber, and sometimes rubber balls, with milk powder.

Furthermore, with conventional prior apparatus a considerable quantity of the powdered product is not properly sifted through the screen, and material, which should have sifted, is discharged with tailings, thus causing waste, or necessitating a resifting operation.

Where the powdered particles were to be classified that is, where the particles were to be sifted into fines, middlings, coarse particles, and tailings, for example, heretofore a plurality of successively smaller mesh screens were placed vertically above one another. The material to be sifted was placed on the largest mesh screen and sifted down through the screens successively, the different particle sizes of the material being taken off the individual screens. This only added to the already considerable height of the apparatus.

One of the objects of the present invention is to provide an improved apparatus for sifting powdered material which will be more compact than sifting apparatus heretofore known.

Another object of this invention is to provide an improved sifting apparatus of the character described which will effectively sift a greater amount of material on a given screen area in less time with less loss than the conventional apparatus.

Another object of this invention is to provide an improved sifting apparatus which does not require the use of rubber balls or agitators for sifting powder particles.

Another object of this invention is to provide an improved sifting apparatus wheerin the motion of the screen alone does the sifting.

Another object of the invention is to provide sifting apparatus with which prcduct contamination is eliminated.

Another object of this invention is to provide an improved sifting apparatus of the character described wherein the pores of the screen will not become clogged even when operating with a powdered material of high moisture content.

A further object of this invention is to provide an improved sifting apparatus of the character described which substantially reduces the percentage of tailings or unsifted product over the conventional sifters.

A still further object of this invention is to provide an improved sifting apparatus of the character described which separates and classifies particles of different sizes.

A still further object of this invention is to provide an improved sifting apparatus of the character described which will separate lumps and foreign matter from liquids as well as sift powdered material.

A still further object of this invention is to provide an improved sifting apparatus which is simple in construction, and relatively inexpensive to manufacture.

Other objects of this invention will become apparent from the drawings, the specification, and the appended claims.

In the drawings:

FIG. 1 is a plan view of a sifter constructed according to one embodiment of this invention with its cover partially cut away to show the interior;

FIG. 2 is a sectional view taken on line 2—2 of FIG. 1, looking in the direction of the arrows;

FIG. 3 is a fragmentary sectional view taken on line 3—3 of FIG. 1 and looking in the direction of the arrows;

FIG. 4 is a fragmentary sectional view taken on line 4—4 of FIG. 2 and looking in the direction of the arrows;

FIG. 5 is a fragmentary sectional view on an enlarged scale taken on line 5—5 of FIG. 1 and looking in the direction of the arrows.

Figure 6:
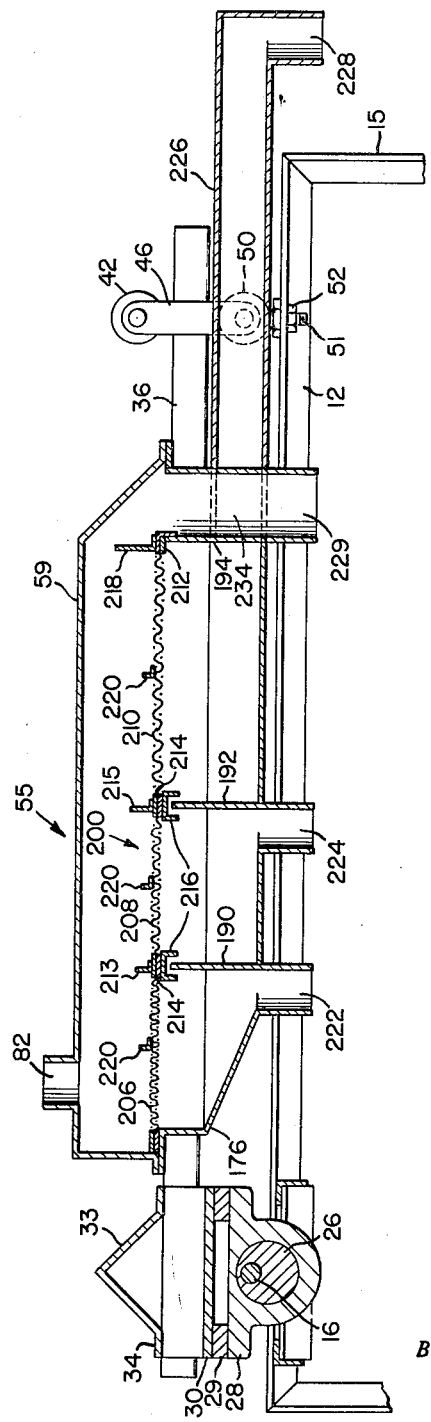
FIG. 6 is a fragmentary longitudinal sectional view on an enlarged scale of a sifter constructed according to another embodiment of this invention for classifying particles of different sizes.

In the illustrated embodiments of the invention, the sifting screen is secured at its edges to the edges of a pan which is intended to receive the sifted product. The screen is slightly flexible in a vertical direction. A cover having an opening at one end thereof encloses the screen-covered pan. The product to be sifted is dumped into this opening onto one end of the screen. The pan is so mounted and actuated that the screen moves in a circular path at the end where the material is deposited on the screen, and in elliptical paths at its opposite end and at intermediate points, the ellipse becoming flatter the more it approaches the discharge end of the screen. This gives the screen a combination horizontal and vertical motion which efficiently sifts the product through the screen while simultaneously moving the unsiftable material longitudinally on top of the screen towards the discharge end of the screen. Baffles are mounted on the screen to control the flow of the product over the screen.

Referring to the drawings by numerals of reference and first to the embodiment of the invention shown in FIGS. 1 to 5, the apparatus disclosed has a base 10, which comprises side members 12 that are spaced parallel to one another and are connected at opposite ends by cross members 14. The base is supported by four legs 15.

Disposed parallel to the cross members 14 is a shaft 16 (FIGS. 2 and 4) which is rotatably mounted in bearings 18 that are mounted adjacent one end of the base 10 on brackets 19 which are secured to one of the cross rails 14. The shaft 16 is driven by a motor 20 which drives a sheave 22 through conventional V-belts 24. Eccentrically mounted on the shaft 16 and rigidly attached thereto in operation is a disc 26 which is disposed intermediate the sheave 22 and one of the bearings 18. The eccentric disc 26 rotates in a strap 28. Mounted on the strap 28 on spacer blocks 29 is a bracket 30 which is rigidly attached to the strap and spacer blocks by nuts and bolts 32 (FIG. 4). The bracket 30 is welded to the flanges 34 of a pyramidal shaped hood or guard 33. This hood or guard extends transversely of the sifter adjacent one end thereof; and its flanges 34 are welded adjacent opposite sides to the parallel, longitudinally-extending side rails 36 of the sifter frame adjacent one end of these rails. The opposite ends of the rails 36 are supported from the side rails 12 of the base. A shaft 40 is rotatably journaled in spaced ball bearings 42, each of which is carried by a stud 44 that is rigidly secured to one of the rails 36 by a nut 45. The shaft 40 has a pair of spaced arms 46 rigidly connected to it; and the lower end of each arm 46 is rigidly attached to a bar 48. Each bar 48 extends parallel to shaft 40 and is rotatably mounted in a bearing 50 which is integral with a stud 51 that is fastened by a nut 52 to one of the rails 12.

A pan denoted as a whole at 55, is welded or otherwise rigidly mounted on the supporting members 36. This pan, which is made preferably of stainless steel, comprises a bottom portion 57 and a removable top 59. The bottom portion 57 of the pan has a section 60 and a section 62 (FIG. 2) which are separated by a partition wall 64 which extends across the bottom portion of the pan adjacent the top thereof. The section 60 communicates at its forward end below the partition wall 64 with a conduit 66 that extends longitudinally from the bottom portion 57 of the pan below and between the rails 36. The conduit 66 terminates at its forward end in a discharge chute 67. The section 62 has a transversely sloping bottom 70 (FIG. 3) which communicates at one side of the pan with a conduit 72.

A flexible screen 75 completely covers the section 60 of the pan and is attached around its perimeter to the bottom portion of the pan by a plurality of screws 77.

The cover 59 is removably attached to the bottom of the pan by conventional clamps 80 and completely covers the screen 75 and the section 62. The cover 59 has an inlet 82 at one end thereof through which the material to be sifted is introduced onto the screen 75.

Mounted on top of the screen 75 and extending transversely of the pan are a plurality of spaced parallel baffles 84, 86, 88 and 90, which extend transversely of the pan. The baffle 84 is higher than baffle 86, and baffle 86 is higher than the baffles 88 and 90 for the reasons which will be explained hereinafter. Mounted at the end of the screen 75 adjacent wall 64 is a baffle 92 which has angularly disposed end portions 93. The central portion of the baffle 92 is higher than the portions 93 (FIGS. 2 and 3); and the baffle 92 throughout its whole length is higher than baffles 84, 86, 88 and 90. Mounted between the baffle 90 and the baffle 92 is a pair of baffles 94 which are disposed substantially parallel to the portions 93 of the baffle 92. The baffles 94 are also higher than baffles 84, 86, 88 and 90.

In operation, the cover 59 is clamped securely on the bottom portion 57 of the pan by means of the clamps 80, and the material to be sifted is dumped in through the opening 82 on top of the screen 75. A suitable container for holding the sifted material is placed beneath the outlet 67 of the conduit 66 and another container to hold the tailings is placed beneath the conduit 72. The motor 20 is then started, which rotates the shaft 16 thus imparting eccentric motion to the disc 26. This eccentric movement of the disc 26 oscillates the end of the pan mounted on the disc in a circular path. The discharge end of the pan, however, is restrained or restricted in its movement by the arms 46 which rock about the axes of bearings 50. Thus, the discharge end is restrained to move in an elliptical path. The movement of the pan changes, therefore, from a circular movement at the end nearest the eccentric 26, to an elliptical movement at the discharge end of the pan. The direction of the major axis of the elliptical movement changes along the length of the pan, and the ellipse is flattest at the discharge end of the pan. This gives a vertical as well as a horizontal motion to the pan. This motion causes the powdered mass to sift through the screen 75 into the section 60 and also causes unsifted material to gradually shift forward across the baffles 84, 86, 88 and 90. The baffles control the rate of flow of the unsifted material across the screen, and prevent the unsifted material from reaching the baffle 92 before it is fully sifted. The baffles 94 direct the material, which has traversed the baffles 84, 86, 88 and 90, toward the central portion of the baffle 92. The central portion of the baffle 92 prevents this lighter material from falling into the section 62 of the pan before being sifted. The tailings, which are the heavier material, travel towards the sides of the pan and spill over the lower portions 93 of the baffle 92 into the section 62 and are carried away by the chute 72. The sifted material in the section 60 flows out through the duct 66 and chute 67 into a suitable container positioned therebelow.

During the oscillating movement of the pan, the screen 75 also flexes vertically which further agitates the powdered mass and assists in clearing the pores of the screen of any powdered material which may adhere thereto.

It should be noted that the greatest agitation of the pan is adjacent the opening 82 through which the material, which is to be sifted, is supplied to the screen. As there is more material on top of the screen at this end the pan, as viewed in the drawings, the baffles 84 and 86 are made higher, as described, to restrict the travel of material to insure effective sifting. The powdered material, not yet sifted, will remain above the screen adjacent baffle 92 until that which is siftable drops into the section 60 and that which is not siftable is shaken over the baffle 92 and into the section 62 and out through the duct or outlet 72.

The embodiment of the invention shown in FIG. 6, is adapted for classifying powdered material. Here the pan 55 has a bottom portion 176 which is enclosed by a removable cover 59 similar to the previously described embodiment. The bottom 176 of the pan is divided into four separate sections by transversely-disposed, longitudinally-spaced, parallel walls 190, 192 and 194. A screen assembly 200 is attached around its perimeter to the pan.

The screen assembly 200 comprises a fine gauge screen 206, a medium gauge screen 208, and a coarse gauge screen 210. The screens 206, 208 and 210 are connected to one another in the same plane by clamping plates 214 which are disposed above the walls 190 and 192. Channel members 216 are attached beneath the clamps 214 to prevent material from getting past the top of a respective wall 190, 192 into the adjoining portion of the pan. The channel members are wider than the walls 190 and 192 so that they extend at both sides of the walls; but they overlap the walls. The tops of the walls are slightly spaced below the members 216 to permit the screen assembly to flex vertically.

A separator or spreader 213 is mounted on one of the clamps 214 at the adjoining edges of the screens 206 and 208 to control the flow of material from the fine gauged screen to the middle gauged screen. A slightly higher separator or spreader 215 is attached to the clamp 214 at the adjoining edges of the screens 208 and 210 to control the flow of material from the middle gauged screen onto the coarse gauged screen. This is to insure that finer material will sift through a finer screen before being carried over onto a coarser screen. A baffle 218 extends transversely across the end of the screen and is rigidly attached to an end rail 212 that extends transversely of the pan. A baffle 220 is disposed transversely across the central portion of each of the different gauge screens 206, 208 and 210, respectively to control the flow of material on its respective screen. The bottom 176 of the pan is so constructed that material sifting through the fine gauge screen 206 will drop through a chute 222, material sifting through the middle gauge screen 208 will drop through a chute 224, and material sifting through the large gauge screen 210 will travel through a conduit 226 and discharge through a chute 228. The material, which does not sift through any one of the screens, travels over a separator or spreader 218 which is secured on top of rail 212, and drops into a chamber 234 and out through a chute 229 which communicates with that chamber. The remaining structure of the embodiment shown in FIG. 6 is similar to that illustrated in connection with the embodiment shown in FIGS. 1 through 5.

The embodiment shown in FIG. 6 is used particularly for separating and classifying fine, middle, and coarse particles of material. The material to be sifted is deposited on the fine gauge screen through the opening 82 in the cover. The pan is then set in motion and the fine particles sift through the fine gauge screen and discharge out through the chute 222. That material, which does not sift through the screen 206, moves over the separator 213 onto the middle gauge screen 208. The larger particles, which can sift through the screen 208, are discharged through the chute 224. The particles of material, which do not sift through the screen 208, shift over the separator 215 and onto the large or coarse gauge screen 210. The coarse particles sift through the screen 210 and discharge out through the conduit 226 and the chute 228. That material, which will not sift through the coarse grain screen moves over the baffle 218 and falls into the chamber 234 and out through the chute 229.

The time that the material stays on a particular screen during operation of the sifter may be controlled by the height of the separators and the baffles.

Both embodiments of sifting apparatus disclosed herein are very versatile in their operation. For example, the throw of the eccentric 26 may be adjusted to increase or decrease the amplitude and ratio of the vertical and horizontal movements of the screen. Also, the speed may be increased or decreased depending upon the material sifted. Moreover, as the speed of rotation of the eccentric is increased, the amplitude of the throw of the eccentric may be decreased. Thus, an almost electronic-type vibration may be achieved, only with greater amplitude than is attainable with electronically operated vibrators. For example, excellent results have been achieved with an amplitude of from one half to one third of an inch at three hundred revolutions per minute, with an amplitude of three-quarters of an inch at six hundred revolutions per minute, with an amplitude of three-eighths of an inch at twelve hundred revolutions per minute, and with an amplitude of three-sixteenths of an inch at twenty-four hundred revolutions per minute. Vibration in a vertical direction is important.

In FIG. 2, the stud 51 is shown positioned so that the arm 46 is vertical and the shaft 40 lies above the bars 48 at one limit of throw of the eccentric 26. By adjusting the studs 51 forward or backward on the rails 12, the vertical component of movement of the pan and screen can be modified. For the purposes of this adjustment several holes may be bored in each rail 12, spaced from one another longitudinally of each rail, to receive selectively the associated stud 51. This adjustment permits delaying or accelerating, as desired, the throw-out of the powder being sifted.

It should be noted that in both embodiments of this invention the baffles are shown straight and extending vertically. The upper portions of some or all of the baffles may, however, be bent forwardly or rearwardly to control the rate of flow of the powder over the screen.

It is contemplated that a coarser screen may be placed on top of the fine mesh sifting screen. This coarser screen will not have any baffles on it. This means in the case of milk powder, for instance that large burnt particles will be quickly carried off the large screen before the product is sifted through the sifting screen and therefore, they will not contaminate the product or be held back by the baffles of the small screen.

While the apparatus of this invention is intended primarily for sifting powdered materials, it is apparent that it may also be used for separating solid particles from liquids such as chocolate liquors, french-fry oil, syrups and the like by merely pouring the liquid through the opening 82 onto the screen. The liquid will drain through the screen and the foreign matter will remain on top and gradually be moved across the screen to discharge through opening 66.

To illustrate the efficiency of this sifting apparatus over the conventional type wherein a rubber ball agitates the material being sifted, the tailing loss in the ordinary conventional sifters is one percent of the total amount of products sifted, while the tailing loss in the sifter of the present invention amounts to one-quarter of one percent or less.

One of the outstanding advantages of the apparatus of the present invention is that the classifying of different size particles can be done with a screen disposed in a single plane instead of requiring a plurality of screens stacked vertically one above the other as in the past. This makes for a more compact and inexpensive apparatus.

While the invention has been described in connection with two different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. A sifting apparatus, comprising a base, a substantially horizontal pan, a slightly flexible screen covering said pan, means above said screen for applying material to be sifted to the upper surface of said screen, first connecting means connecting one end of said pan to the base to move said one end of the pan in a substantially circular path, and second connecting means connecting the other end of said pan to the base, said second connecting means including rigid means which rock about a substantially horizontal axis substantially transverse to the longitudinal axis of said pan, said first and second connecting means cooperating to produce substantially elliptical movement of said other end of said pan.

2. A shifting apparatus, comprising a base, a pan having at least two longitudinal sections, a screen covering one of said sections, a cover attached to said pan and covering said screen and both said sections, said cover having an inlet opening through which material to be sifted is deposited on said screen adjacent one end of the pan, and means including a disc-like member fixed to a revolving shaft connected to one end of said pan and to said base, and rigid pivoting means connecting the opposite end of said pan to said base to oscillate said pan horizontally and vertically simultaneously, said connecting means causing said one end of the pan to oscillate a greater distance vertically than the other end of the pan, whereby some of said material passes through said screen at various points thereof and unsifted material travels longitudinally on said screen and into said other section of the pan.

3. A sifting apparatus comprising a base, a pan, a screen covering said pan and attached thereto around the marginal edges of said screen, said screen being slightly flexible in a vertical direction, means connecting said pan at one end to said base to move said one end in a substantially circular path about a horizontal axis, means connecting the other end of said pan to the base to cause said other end to move in an elliptical path about horizontal axes, and a plurality of spaced baffles mounted transversely on top of the screen and extending parallel to the axis of rotation about which said one end of said pan moves.

4. An apparatus according to claim 3 wherein said spaced baffles are vertical and of different heights.

5. An apparatus according to claim 3 selected ones of said baffles are of different heights which increase from said one end of the pan to the other.

6. An apparatus according to claim 3 selected ones of said baffles are of different heights which decrease from said one end of the pan to the other.

7. A sifting apparatus for powdered material, comprising a base, a pan, a plurality of screens of progressively larger gauge covering respectively different longitudinal portions of said pan, each screen disposed over said pan and successive screens adjoining one another and being disposed in substantially the same horizontal plane, means for depositing material to be sifted on the smallest gauge screen, and means connecting said pan to said base for oscillating said pan longitudinally to move some of said material longitudinally over said screens to separate particles of different size, said oscillating means producing substantially circular movement of said pan in the region where said smallest gauge screen is located and producing substantially elliptical movement of the end of the pan opposite said region.

8. A sifting apparatus for separating particles of material of different size, comprising a base, a pan a plurality of adjacent screens of increasing gauge each disposed over said pan and all lying substantially in the same plane, baffles mounted transversely on top of said screens at the junctures of each pair of two adjacent screens, means for initially depositing the material to be sifted on the finest gauge screen, means for separately receiving the material sifted through the respective screens, and means connecting said pan to said base for oscillating the screens as a unit to sift some of the material through the screens and move the unsiftable material longitudinally of the screens and to discharge the same at the end of the coarsest screen, said connecting means producing substantially circular movement of said pan in the region in which said finest gauge screen is located and substantially elliptical movement at the end of the pan opposite said region.

9. A sifting apparatus comprising a base, a pan, means for supporting said pan adjacent one end thereof, comprising a first shaft journaled in said base, and a disc on which said pan is mounted, said disc being secured to said first shaft and having its periphery eccentric of said first shaft, said pan having a transverse wall dividing it into two sections, one of said sections extending from said one end of said pan toward the other end thereof, and the other section being disposed adjacent said other end, a screen secured to said pan in a substantially horizontal plane over said one section, means for pivotally connecting said other end of said pan to said base comprising a second shaft journaled on said base with its axis parallel to the axis of said first shaft, a third shaft parallel to said first and second shafts, an arm rigidly secured at opposite ends of said second and third shafts, respectively, means for suspending said pan from said third shaft, and means for rotating said first shaft to oscillate said pan to cause material deposited on said screen, but not siftable therethrough, to move longitudinally across said screen to discharge into said other section.

10. An apparatus according to claim 9 wherein a baffle is mounted transversely on said screen at the edge of said screen adjacent said other section, so that material deposited on said screen must pass over said baffle to discharge into said other section.

11. The sifting apparatus according to claim 1 wherein said first connecting means includes a shaft rotatably mounted on said base, a single disc-like member eccentrically mounted on said shaft, and a journal in which said disc-like member rotates; wherein one end of said pan is rigidly attached to said journal; wherein there is additionally provided a screen covering said pan, and a cover which covers said screen and said pan; and wherein said cover is provided with means for introducing material to be sifted through said cover onto the upper surface of said screen adjacent said one end of said pan.

References Cited in the file of this patent

UNITED STATES PATENTS

| | | |
|---|---|---|
| 1,468,261 | Collins | Sept. 18, 1923 |
| 1,839,614 | Symons | Jan. 5, 1932 |
| 1,971,156 | Hallenbeck | Aug. 21, 1934 |
| 2,395,138 | Nicholls | Feb. 19, 1946 |
| 2,819,796 | Edwards | Jan. 14, 1958 |

FOREIGN PATENTS

| | | |
|---|---|---|
| 6,540 | Great Britain | Mar. 28, 1883 |
| 13,955 | Great Britain | Mar. 8, 1906 |